B. W. BENNETT.
AGRICULTURAL IMPLEMENT.
APPLICATION FILED JAN. 29, 1912.
1,047,607.
Patented Dec. 17, 1912.
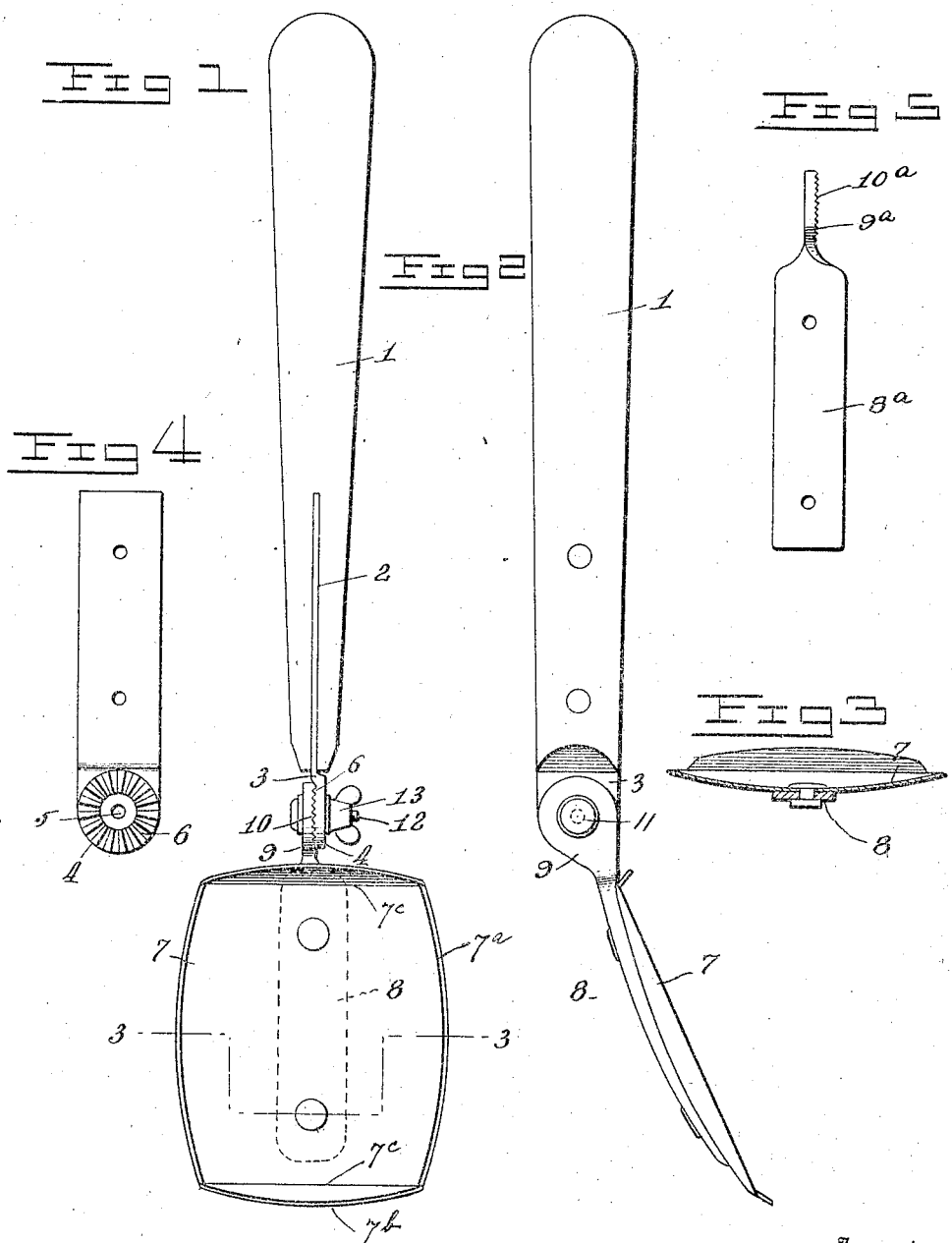
Witnesses
Inventor
Benjamin W. Bennett
By
Attorney

UNITED STATES PATENT OFFICE.

BENJAMIN W. BENNETT, OF POPLAR HALL FARM, PRINCESS ANNE COUNTY, VIRGINIA.

AGRICULTURAL IMPLEMENT.

1,047,607.  Specification of Letters Patent.  Patented Dec. 17, 1912.

Application filed January 29, 1912. Serial No. 674,092.

*To all whom it may concern:*

Be it known that I, BENJAMIN W. BENNETT, a citizen of the United States, residing at Poplar Hall Farm, in the county of Princess Anne and State of Virginia, have invented new and useful Improvements in Agricultural Implements, of which the following is a specification.

This invention relates to hand implements for agricultural purposes, and particularly to a tool for thinning young plants, the seeds of which have been sown closely and continuously in beds. After sprouting and while quite young, it is desirable and necessary to thin these plants, and for this purpose the present invention has been devised.

The object of the invention is to provide a small, light hoe or thinning tool for use more particularly in cultivating spinach, as up to the present time no tool has been found suitable for the purpose, whereby the best results may be obtained, other than an ordinary large iron culinary spoon.

The cause of failure of known implements resides in the fact that the blade thereof is set at a fixed angle to the handle and cannot be changed to suit the individuality of each "hand" or operative. For this reason the various implements designed for the purpose have been abandoned and the spoon substituted therefor because the handle of the spoon can be bent by each "hand" to suit his or her peculiarity or method of employing the tool. One great objection to the use of a spoon is the expense attending the same, as the constant bending back and forth of the handle to suit the one who uses the spoon soon breaks the handle, thus rendering the spoon useless.

Another objection to a spoon as an implement relates to the shape of its bowl, which, having curved sides and ends of short radii, does not make cuts of even width in the ground which is desired for the best results.

The present invention provides for the individual wants of each "hand" by pivotally attaching the blade to the handle so that the blade may be set at any required angle and fixed after adjustment against accidental change.

For a clear understanding of the invention, attention is directed to the following detailed description and appended claim, in connection with the accompanying drawing, in which:

Figure 1 is an elevation of the improved implement. Fig. 2 is a similar view at a right angle to Fig. 1. Fig. 3 is a sectional view on the line 3—3 of Fig. 1. Fig. 4 is a side view of a detail of the invention. Fig. 5 is a detail view of a modification.

In the drawing, the numeral 1 designates a handle, preferably short and slotted longitudinally at one end to receive the tang 2 of hinge plate 3 projecting beyond the end of the handle and finished with a semicircular end 4 having an opening 5 therethrough in the axis of said end, and a circular series of teeth or serrations 6 surrounding said opening.

A blade 7 of a general rectangular form and slightly dished with gently curved sides 7ª ground to cutting edges, and somewhat rounded ends 7ᵇ bent sharply upward on parallel lines 7ᶜ as shown, is riveted or otherwise fastened on the upper side of a metal strip 8, one end 9 of which projects beyond the turned up end 7ᵇ of the blade 7 nearest the handle; said projecting end 9 of the strip 8 lies at a right angle to the strip and is provided with a through opening 11 surrounded on one side by a ring of teeth or serrations 10. The blade 7 is attached to the handle 1 by placing the parts 4 and 8 facewise against each other with their openings 5 and 8 in line and the two series of teeth 6 and 10 interengaging each other. A bolt 12 is then passed through the openings 8 and 9 and a thumb nut 13 threaded on said bolt to clamp the parts 4 and 9 together, the teeth or serrations preventing the blade slipping around the pivot bolt. On loosening the thumb nut 13, the angular position of the blade relatively to the handle may be changed to suit the user and then by tightening the thumb nut, the parts are again firmly clamped together.

In Figs. 1 and 2 the strip 8 is there shown as a malleable iron casting, it may however be made of a piece of strap or sheet metal of proper width, as in Fig. 5, the hinged end 9ª being formed by bending the strip 8ª at a right angle and cutting grooves in one side to form teeth 10ª. The plate 3 may also be made straight instead of offsetting its serrated end 4 as in Fig. 1.

By making the blade 7 of the shape, or approximately the shape shown, the width of the cut is determined by the transverse parallel lines 7ᶜ on which the upper and lower ends 7ᵇ of the blade are bent. Formed thus it is immaterial whether the tool makes a shallow or a deep cut, its width being always the same, and the space between cuts easily regulated and maintained constant with a little experience.

Having fully described my invention what I claim as new is:—

An implement of the kind described comprising a handle, and a blade adjustably pivoted on said handle, said blade being slightly dished and having a general rectangular shape with gently curved lateral cutting edges, and a toe and heel bent upwardly at sharp angles on transverse parallel lines, said angles determining the constant width of the cut made by the blade, whether said cut be shallow or deep.

In testimony whereof I have hereunto set my hand in presence of two subscribing witnesses.

BENJAMIN W. BENNETT.

Witnesses:
T. D. SAVAGE,
JANIE M. CURRIE.